(12) United States Patent
Jung et al.

(10) Patent No.: US 9,242,563 B2
(45) Date of Patent: Jan. 26, 2016

(54) METHOD AND APPARATUS FOR CONTROLLING DRIVE MOTOR

(71) Applicants: Hyundai Motor Company, Seoul (KR); Kia Motors Corporation, Seoul (KR)

(72) Inventors: Jae Won Jung, Seoul (KR); Soon Il Jeon, Gyeonggi-do (KR); Ji Sang Park, Gyeonggi-do (KR); Dong Hoon Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/540,260

(22) Filed: Nov. 13, 2014

(65) Prior Publication Data

US 2015/0360570 A1  Dec. 17, 2015

(30) Foreign Application Priority Data

Jun. 17, 2014 (KR) ................. 10-2014-0073651

(51) Int. Cl.
| | | |
|---|---|---|
| *B60L 7/08* | (2006.01) | |
| *B60T 7/04* | (2006.01) | |
| *B60T 8/171* | (2006.01) | |
| *B60T 8/172* | (2006.01) | |
| *B60T 7/06* | (2006.01) | |

(52) U.S. Cl.
CPC . *B60L 7/08* (2013.01); *B60T 7/042* (2013.01); *B60T 7/06* (2013.01); *B60T 8/171* (2013.01); *B60T 8/172* (2013.01)

(58) Field of Classification Search
CPC .......... B60L 7/08; B60T 7/042; B60T 8/171; B60T 8/172; B60T 7/06
See application file for complete search history.

(56) References Cited

U.S. PATENT DOCUMENTS

| | | | |
|---|---|---|---|
| 7,167,783 B2* | 1/2007 | Park et al. | 701/22 |
| 2002/0180266 A1* | 12/2002 | Hara et al. | 303/152 |
| 2004/0204291 A1* | 10/2004 | Atarashi et al. | 477/183 |
| 2007/0252428 A1* | 11/2007 | Okano et al. | 303/113.1 |
| 2012/0089311 A1* | 4/2012 | Burnett | 701/70 |
| 2013/0211644 A1* | 8/2013 | Yokoyama et al. | 701/22 |

FOREIGN PATENT DOCUMENTS

| | | |
|---|---|---|
| JP | H08-098313 | 4/1996 |
| JP | H09-272418 A | 10/1997 |
| JP | 2000-264184 A | 9/2000 |
| JP | 2001-008306 A | 1/2001 |
| KR | 10-2004-0021872 | 3/2004 |
| KR | 10-2013-0038159 | 4/2013 |
| KR | 10-2013-0136780 A | 12/2013 |

* cited by examiner

*Primary Examiner* — Mary Cheung
*Assistant Examiner* — Rodney Butler
(74) *Attorney, Agent, or Firm* — Mintz Levin Cohn Ferris Glovsky and Popeo, P.C.; Peter F. Corless

(57) ABSTRACT

A method and system for controlling a drive motor are provided. The method includes determining whether a vehicle is at a sudden braking event by detecting a brake depth of a brake pedal and calculating a depth rate of the brake pedal based on the detected brake depth. In addition, the drive motor is operated to reduce regenerative braking torque when the vehicle is determined to be at the sudden braking event.

15 Claims, 4 Drawing Sheets

METHOD AND APPARATUS FOR CONTROLLING DRIVE MOTOR

CROSS-REFERENCE TO RELATED APPLICATION

The present application claims priority of Korean Patent Application Number 10-2014-0073651 filed on Jun. 17, 2014, the entire contents of which application are incorporated herein for all purposes by this reference.

BACKGROUND

1. Technical Field

The present invention relates to a method and apparatus for controlling a drive motor, and, more particularly, to a method and apparatus for controlling a drive motor, by which the physical shock applied to a drive motor, occurring during the sudden braking of a vehicle, is reduced.

2. Description of the Related Art

Fuel cell vehicles, electric vehicles, and hybrid vehicles obtain main power from a drive motor, and, unlike engine driven vehicles mounted with a hydraulic transmission, these environmentally-friendly vehicles are configured to have a serial connection structure between a drive motor and a wheel. This connection structure improves fuel efficiency and the results in substantially high efficiency of power transmission. However, in such a configuration the driver may be physically shocked upon the torque conversion of a drive motor due to the absence of a shock-absorbing mechanism between a wheel and a drive motor.

Particularly, this shock may be aggravated by the sudden braking of a vehicle. Before the sudden braking of a vehicle, a driver's foot is removed from an accelerator pedal, with the associated performance of regenerative braking, together with the application of a reverse torque to a drive motor. Subsequent sudden braking by the driver causes the instantaneous application of a forward torque to the driver motor, thus physically shocking the driver again due to the torque conversion. This shock result also increases when an ABS (anti-lock braking system) is actuated upon a sudden braking event of a vehicle on a low-friction road. Therefore, there is a need for a strategy of reducing the physical shock attributable to torque conversion at a sudden braking event of a vehicle.

It is to be understood that the foregoing description is provided to merely aid the understanding of the present invention, and does not mean that the present invention falls under the purview of the related art which was already known to those skilled in the art.

SUMMARY

Accordingly, the present invention provides a method and apparatus for controlling a drive motor, wherein regenerative braking torque is reduced before a sudden braking event based on predicting sudden braking, resulting in a decrease in the intensity of torque conversion when the sudden braking occurs and thus a decrease in the physical shock applied to a driver.

An aspect of the present invention provides a method for controlling a drive motor, including: determining whether a vehicle is at a sudden braking event by detecting a brake depth of a brake pedal and by calculating a depth rate of the brake pedal based on the detected brake depth; and controlling a drive motor such that a regenerative braking torque is reduced when the vehicle is determined to be at the sudden braking event.

Further, in the controlling of the drive motor, the drive motor may be controlled to be located at a neutral state. In the determination of whether a vehicle is at a sudden braking event, the brake depth change of the brake pedal per unit time may be calculated based on the detected brake depth, and the depth rate thereof may be calculated based on the calculated brake depth change. In addition, in the determination of whether a vehicle is at a sudden braking event, the calculated brake depth change and the unit time may be accumulated, and the depth rate thereof may be calculated by the brake depth change accumulated during the accumulated unit time.

Further, in the determination of whether a vehicle is at a sudden braking event, the calculated brake depth change and the unit time may be accumulated in response to determining that the calculated brake depth change is positive and the vehicle is not currently at a sudden braking event. The depth rate may be calculated when the accumulated brake depth change exceeds a first predetermined braking value. In addition, the vehicle may be determined to be at a sudden braking event when the calculated depth rate exceeds a second predetermined braking value.

Both of the accumulated brake depth change and unit time may be reset when the vehicle is determined to be at a sudden braking event. The brake depth change may be accumulated in response to determining that the brake depth change is negative and the vehicle is currently at a sudden braking event. Further, the sudden braking of a vehicle may be released when the accumulated brake depth change is less than a predetermined reset criterion. In the controlling of the drive motor, the regenerative braking torque of the drive motor may be gradually increased when the sudden braking event of a vehicle is released.

Another aspect of the present invention provides an apparatus for controlling a drive motor, which may include: a brake pedal sensor configured to detect a brake depth of a brake pedal; and a controller configured to determine whether a vehicle is at a sudden braking event by calculating a depth rate of the brake pedal based on the detected brake depth, and operating a drive motor to reduce regenerative braking torque when the vehicle is determined to be at a sudden braking event (e.g., during sudden braking).

The controller may be configured to operate the drive motor to cause the driver motor to be at a neutral state when the vehicle is determined to be at a sudden braking event. In addition, the controller may be configured to operate the drive motor to decrease regenerative braking torque based on the calculated depth rate when the vehicle is determined not to be at a sudden braking event. The controller may include a data map for calculating the reduction rate of regenerative braking torque based on the calculated depth rate, wherein the data map may be set such that the reduction rate thereof is gradually increased with the increase of the depth rate.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present invention will be described in detail with reference to the attached drawings.

Figure 1:
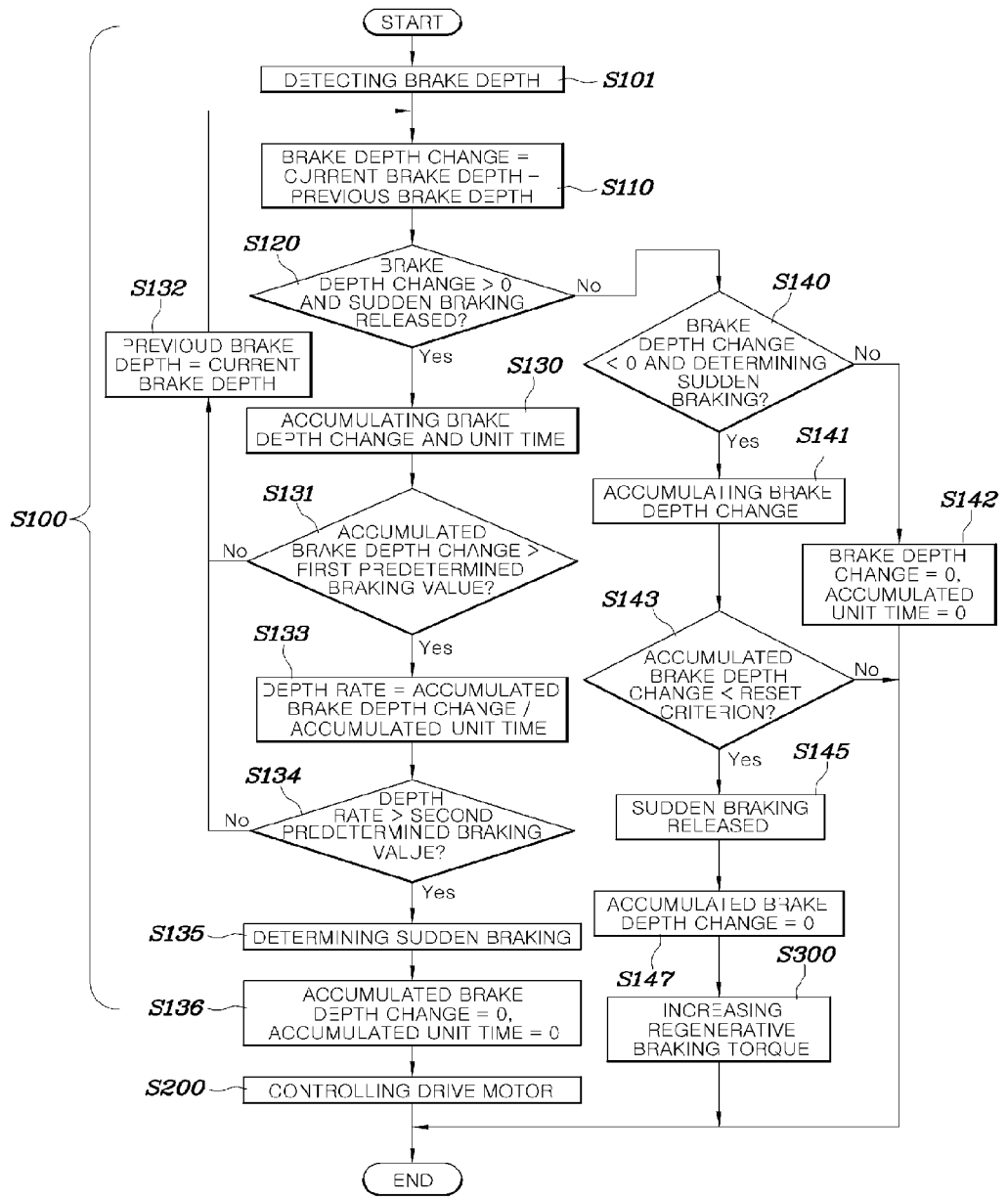
FIG. 1 is an exemplary flowchart showing a method of controlling a drive motor according to an exemplary embodiment of the present invention.
Figure 2:
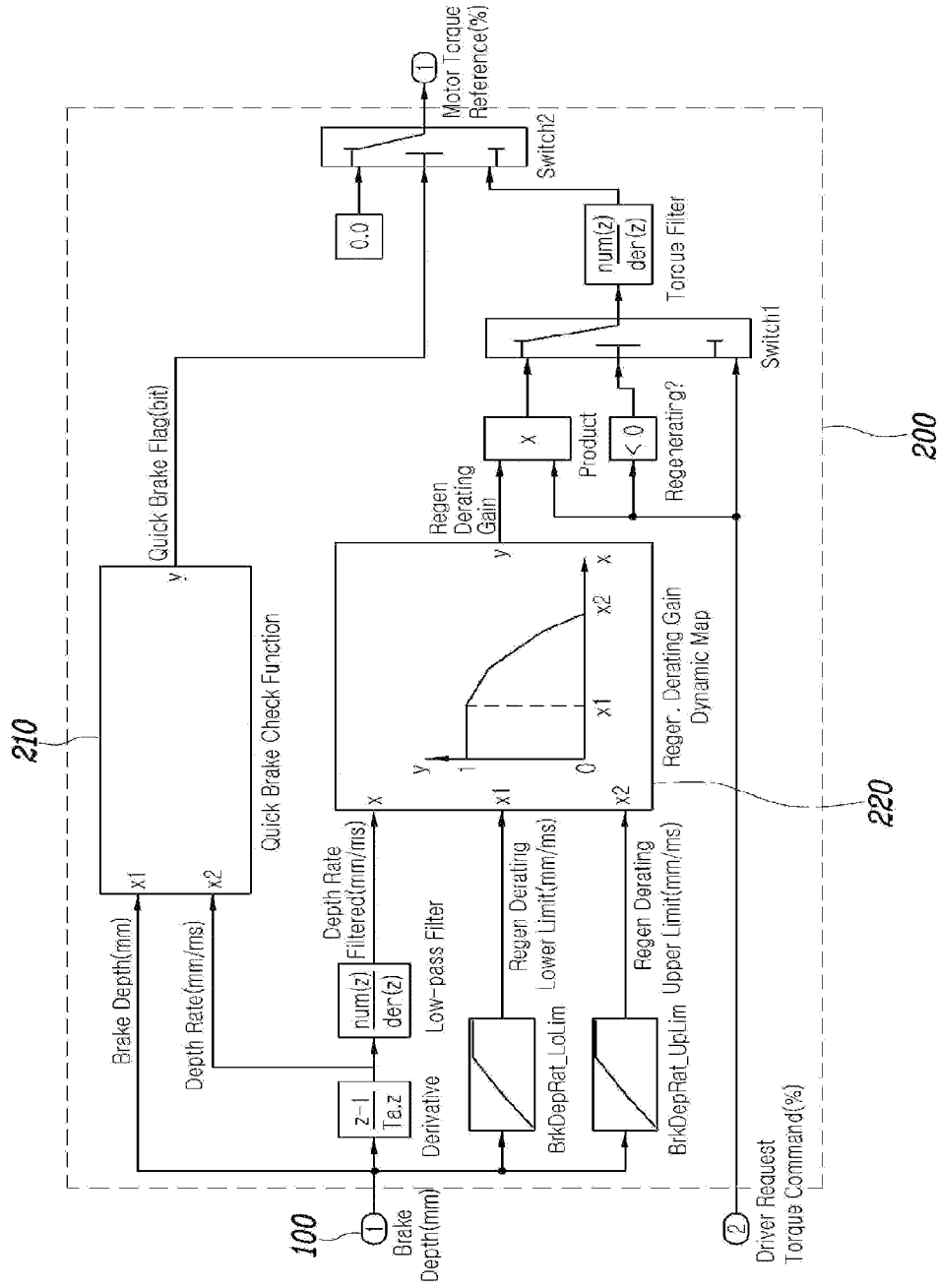
FIG. 2 is an exemplary block diagram showing the configuration of an apparatus for controlling a drive motor according to an exemplary embodiment of the present invention.
Figure 3:
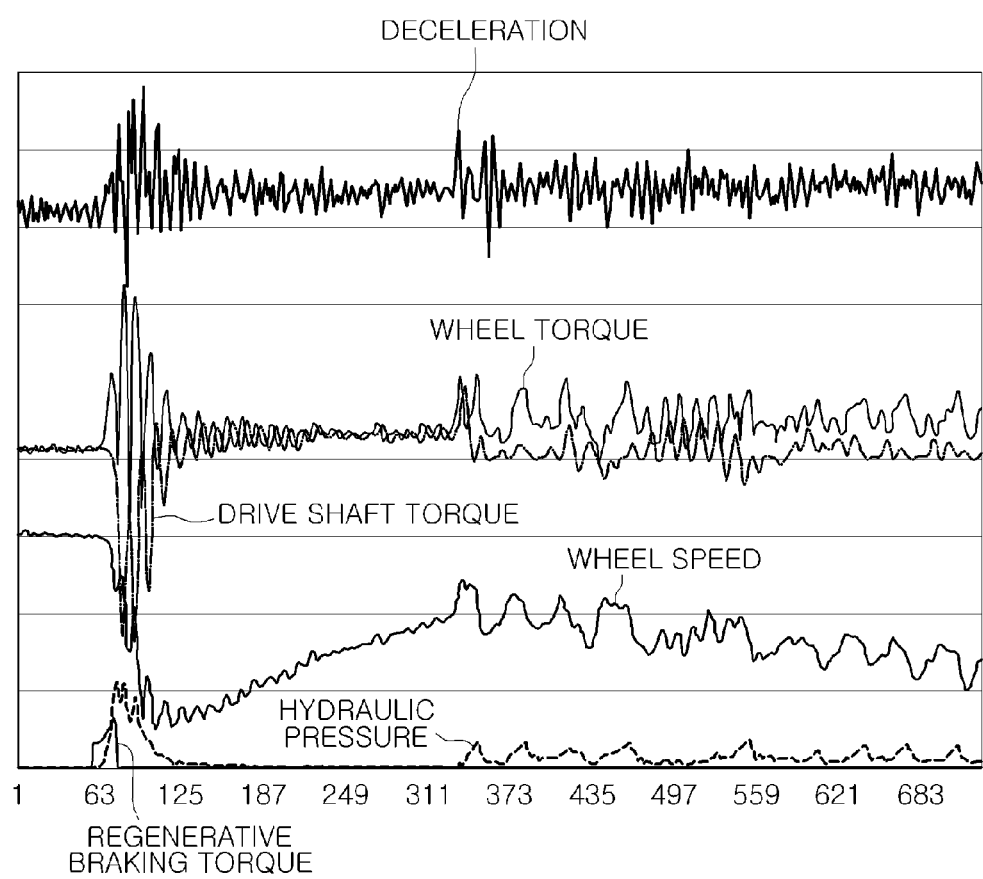
FIGS. 3 and 4 are exemplary views showing the variations of torque and deceleration according to the method and apparatus for controlling a drive motor according to an exemplary embodiment of the present invention.
Figure 4:
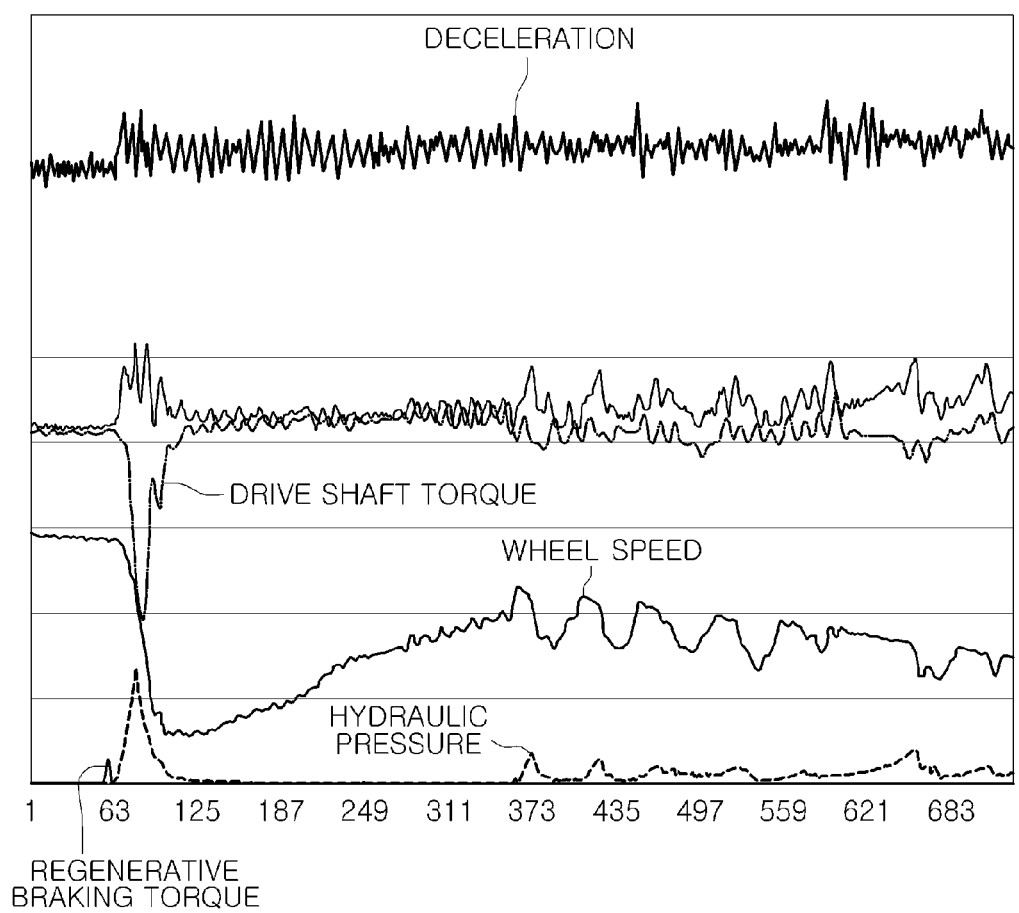

FIG. 1 is an exemplary flowchart showing a method for controlling a drive motor according to an exemplary embodiment of the present invention, FIG. 2 is an exemplary block diagram showing the configuration of an apparatus for controlling a drive motor according to an exemplary embodiment of the present invention, and FIGS. 3 and 4 are exemplary views showing the variations of torque and deceleration according to the method and apparatus for controlling a drive motor according to an exemplary embodiment of the present invention.

The method for controlling a drive motor according to an exemplary embodiment of the present invention may include: determining, by a controller, whether a vehicle is at a sudden braking event (S100) by detecting a brake depth of a brake pedal (S101) and by calculating a depth rate of the brake pedal based on the detected brake depth (S150); and operating a drive motor to reduce a regenerative braking torque when the vehicle is determined to be at the sudden braking event (e.g., during sudden braking) (S200).

More specifically, as shown in FIG. 1, the determination of whether a vehicle is at a sudden braking event (S100) may include detecting a brake depth of a brake pedal, and calculating a brake depth change for a given time (S110). In particular, the brake depth change may be a difference in brake depth between predetermined time points, and a depth rate may be defined as a brake depth change per unit time. The unit time may be a period of detecting the brake depth of the brake pedal, and may be set by experimentation according to the intentions of those skilled in the art.

After the calculation of the brake depth change of the brake pedal (S110), measurements of the brake depth change and the unit time may be accumulated (S130), and used to calculate the depth rate (S133). For the calculation of the depth rate (S133), the calculated brake depth change and the unit time may be accumulated (S130) to determine, by the controller, whether the driver performs a continuous braking action (e.g., whether the brake pedal is continuously engaged) and to prevent misjudgment upon the driver's suddenly braking the vehicle. Therefore, whether the calculated brake depth change is positive and whether the vehicle is currently at a sudden braking event (S120) may be determined by the controller prior to the accumulation of the brake depth change. When the calculated brake depth change is determined to be positive and the vehicle is determined to not be at a sudden braking event (e.g., determined to not be suddenly braking), the accumulation of the calculated brake depth change and the unit time may be accumulated by the controller. Since a positive brake depth change may indicate that a driver presses a brake pedal (e.g., that the brake pedal is engaged), the brake depth change may be accumulated (S130) when the driver is determined to intentionally press the brake pedal (e.g., in response to determining an intentional brake pedal engagement).

Moreover, the controller may be configured to compare the accumulated brake depth change and a first predetermined braking value (S131). In particular, when the accumulated brake depth change exceeds (e.g., is greater than) the first predetermined braking value, the depth rate may be calculated. The first predetermined braking value may be an accumulated brake depth of the brake pedal, serving as a criterion for determining whether the driver is suddenly braking the vehicle. As the first predetermined braking value decreases, the controller may be configured to determine whether a driver perform sudden braking, thus advancing the point of time at which regenerative braking torque may be reduced by operating a drive motor before the sudden braking of a vehicle. However, when the first braking value is decreased, an increase may occur in the risk of misjudgment that the vehicle is at a sudden braking event even when a substantially small brake depth is detected. In addition, poor fuel efficiency may be experienced due to the criterion of reducing regenerative braking torque. Therefore, the first braking value may be set through repetitive experiments of those skilled in the art such that it is consistent with the intentions of a vehicle and a designer.

When the accumulated brake depth change does not exceed the first predetermined braking value, the controller may be configured to determine that sudden braking is not intended. In particular, the detected brake depth may be stored (S132) and applied to next calculation of the brake depth change. After the calculation of the depth rate (S133), to the controller may be configured to determine whether the calculated depth rate exceeds a second predetermined braking value (S134). When the calculated depth rate exceeds the second predetermined braking value, the controller may be configured to determine that a vehicle suddenly stops (S135). The second predetermined braking value may be the pressing speed of a brake pedal, serving as a criterion for determining whether the driver is suddenly braking the vehicle.

At a substantially low second predetermined braking value (e.g., less than a predetermined braking value), the vehicle may be determined to be at a sudden braking event even though the pressing speed decreases. In addition, when the second predetermined braking value is at a higher value, the vehicle may not be determined to be suddenly braking even though a brake pedal is engaged with the intention of sudden braking. Therefore, the second predetermined braking value may be set through repetitive experiments of those skilled in the art such that it is consistent with the intentions of a vehicle and a designer. Finally, when the vehicle is determined to be at a sudden braking event (S135), accumulated data of both the brake depth change and the unit time may be reset (S136).

Given the above-illustrated configuration, the driver's intention for sudden braking may be determined to prevent misjudgment regarding sudden braking, resulting in a reduction in performing a undesired reduction of regenerative braking torque and thus in increasing fuel efficiency.

After the calculation of the brake depth change (S110), the controller may be configured to determine whether the calculated brake depth change is positive and whether a vehicle is at a sudden braking event (S120). Then, the controller may be configured to determine whether the calculated brake depth change is negative and whether a vehicle is currently at a sudden braking event (S140). In particular, when a negative calculated brake depth change and sudden braking event occur in the vehicle, the brake depth change may be accumulated (S141). A negative brake depth change may indicate an intention to release braking (e.g., disengaging the brake pedal) by releasing pressure from the brake pedal. Thereafter, the accumulated brake depth change may be compared with the predetermined reset criterion (S143). When the accumulated brake depth change is less than the predetermined reset criterion, the sudden braking of a vehicle may be released. Then, the accumulated brake depth changes may be reset (S147).

The reset criterion may be a reference value for releasing the sudden braking of a vehicle. A lower reset criterion allows the vehicle to be more easily released from a sudden braking state. Further, a higher a reset criterion may be set to maintain the sudden braking state of the vehicle for a longer period of time. The reset criterion may be set as various default values as it is determined through many experiments to satisfy the intentions of the designer. Further, when the controller determines (S140) that the calculated brake depth change is not negative and/or the vehicle is not at a sudden braking event, both the accumulated brake depth change and accumulated unit time may be reset (S142).

Meanwhile, when the vehicle is determined to be at a sudden braking event in the determining step (S100), the drive motor may be operated to be at a neutral state (S200). In other words, to prevent the sudden braking-induced torque change of a drive motor from causing a physical shock, the drive motor may be adjusted to be at a neutral state to make the regenerative braking torque zero (0).

Furthermore, when the sudden braking of a vehicle is released, the regenerative braking torque of the drive motor may be gradually increased (S300), which may be effective in preventing the occurrence of physical shock and noise at the time of sudden returning of regenerative braking torque. To increase the regenerative braking torque (S300), an additional rising map for outputting rising rates changed based on time may be provided, or a fixed rising rate may be used. The rising rate or the rising map may be variously set through experiments by those skilled in the art such that a driver does not feel fatigue due to the occurrence of physical shock at the time of returning of regenerative braking torque.

Moreover, FIG. 2 is an exemplary block diagram showing an apparatus for controlling a drive motor according to an exemplary embodiment of the present invention. The apparatus for controlling a drive motor according to an exemplary embodiment of the present invention may include: a brake pedal sensor 100 configured to detect the brake depth of a brake pedal; and a controller 200 configured to determine whether a vehicle is at a sudden braking event by calculating a depth rate of the brake pedal based on the detected brake depth and then operating a drive motor (not shown) to reduce regenerative braking torque when the vehicle is determined to be at a sudden braking event.

In particular, the controller 200 may be configured to calculate a brake depth change by the difference between the detected brake depth and the previously-detected brake depth, accumulate the calculated brake depth change and unit time after the calculation of the brake depth change, and calculate the depth rate by the brake depth change accumulated during the accumulated unit time. Further, the detected brake depth may be stored and then used in the next process of calculating the brake depth change. The unit time may be a period for detecting the brake depth of the brake pedal, and may be variously set by experimentation according to the intentions of those skilled in the art.

The controller 200 may further include a sudden braking determining unit 210. When the sudden braking determining unit 210 determines that sudden braking will be performed (e.g., sudden braking may occur) based on the calculated brake depth change and depth rate according to the method of controlling a drive motor, the controller 200 may be configured to operate the drive motor to position the driver motor at a neutral state, that is, regenerative braking torque is made zero (0). Thus, the physical shock applied to the drive motor due to the sudden torque conversion may be prevented, thereby reducing noise and vibration.

Additionally, the controller 200 may include a data map 220 for calculating the reduction rate of regenerative braking torque based on the calculated depth rate, and may be configured to operate the drive motor to reduce regenerative braking torque based on the reduction rate output from the data map 220. In the data map 220, the reduction rate gradually increases with the increase of the depth rate. In other words, in the data map 220, regenerative braking torque may be reduced as braking force increases.

More specifically, as shown in the data map 220 of FIG. 2, when the minimum depth rate (X1) and the maximum depth rate (X2) are provided for the reduction of regenerative braking torque and the depth rate does not exceed the minimum depth rate (X1), regenerative braking torque may not be reduced, and predetermined regenerative braking may be performed. However, when the depth rate exceeds the minimum depth rate (X1), regenerative braking torque may begin to be reduced, and when the depth rate exceeds the maximum depth rate (X2), regenerative braking may not be performed. The minimum depth rate (X1) and the maximum depth rate (X2)

may be variously set according to the characteristics of a drive motor and the intentions of a designer. The controller may be configured to operate a drive motor to gradually decrease regenerative braking torque based on the reduction rate, when a vehicle is at a sudden braking event (e.g., during sudden braking). Therefore, when possible, the maximum regenerative braking force may be assured according to the degree of braking (e.g., how much the brake pedal is engaged), and the difference between sudden braking and general braking may be determined, thus minimizing the consumption of fuel.

Meanwhile, FIGS. 3 and 4 are exemplary schematic views showing the variations of torque and deceleration according to the method and apparatus for controlling a drive motor. In particular, FIG. 3 shows the variation of torque while the ABS is operated according to a conventional control method, and FIG. 4 shows the variation of torque while the ABS is operated according to the control method of the present invention. As shown in FIGS. 3 and 4, when wheel speed is reduced by the occurrence of sudden braking of a vehicle, the variations of counter torque and static torque may be repeatedly and rapidly generated by the operation of ABS, and thus variations of a drive shaft and deceleration may be generated.

Further, according to the control method of the present invention, the degree of variation of torque in this control method may be substantially low compared to the degree of torque in a convention control method even though static torque is generated by the operation of ABS while wheel speed is decreased by the occurrence of sudden braking due to regenerative braking torque being reduced by brake pedal engagement before the operation of ABS. In other words, the occurrence of physical shock and noise based on the variation of torque may be significantly reduced.

As described above, according to the method and apparatus for controlling a drive motor, the physical shock and noise generated by the torque change during sudden braking may be reduced by reducing or removing regenerative braking torque before the sudden braking, thereby improving riding quality and running stability. Further, a drive motor may be operated to adjust the degree of removing regenerative braking torque based on the degree of sudden braking, thereby reducing fuel consumption and improving shock absorbency.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a drive motor, comprising:
    a brake pedal sensor configured to detect a brake depth of a brake pedal; and
    a controller configured to determine whether a vehicle is at a sudden braking event by calculating a depth rate of the brake pedal based on the detected brake depth, and operate a drive motor to reduce regenerative braking torque when the vehicle is determined to be at a sudden braking event,
    wherein the controller is configured to operate the drive motor to position the driver motor at a neutral state when the vehicle is determined to be at a sudden braking event.

2. The apparatus of claim 1, wherein the controller is configured to operate the drive motor to decrease regenerative braking torque based on the calculated depth rate when the vehicle is determined not to be at a sudden braking event.

3. The apparatus of claim 1, wherein the controller includes a data map for calculating a reduction rate of regenerative braking torque based on the calculated depth rate, wherein the data map is set to gradually increase the reduction rate with the increase of the depth rate.

4. A method for controlling a drive motor, comprising:
    determining, by a controller, whether a vehicle is at a sudden braking event by detecting a brake depth of a brake pedal and calculating a depth rate of the brake pedal based on the detected brake depth; and
    operating, by the controller, a drive motor to reduce a regenerative braking torque when the vehicle is determined to be at the sudden braking event,
    wherein in the operation of the drive motor, the drive motor is operated to be positioned at a neutral state.

5. The method of claim 4, wherein in the determination of whether a vehicle is at a sudden braking event, the brake depth change of the brake pedal per unit time is calculated based on the detected brake depth, and the depth rate thereof is calculated based on the calculated brake depth change.

6. The method of claim 4, wherein in the determination of whether a vehicle is at a sudden braking event, the vehicle is determined to be at a sudden braking event when the calculated depth rate exceeds a second predetermined braking value.

7. The method of claim 5, wherein in the determination of whether a vehicle is at a sudden braking event, the calculated brake depth change and the unit time are accumulated, and then the depth rate thereof is calculated by the brake depth change accumulated during the accumulated unit time.

8. The method of claim 5, wherein in the determination of whether a vehicle is at a sudden braking event, the brake depth change is accumulated in response to determining that the brake depth change is negative and the vehicle is currently at a sudden braking event.

9. The method of claim 7, wherein in the determination of whether a vehicle is at a sudden braking, the calculated brake depth change and the unit time are accumulated in response to determining that the calculated brake depth change is positive and the vehicle is not currently at a sudden braking event.

10. The method of claim 7, wherein in the determination of whether a vehicle is at a sudden braking event, the depth rate is calculated when the accumulated brake depth change exceeds a first predetermined braking value.

11. The method of claim 7, wherein both of the accumulated brake depth change and unit time are reset when the vehicle is determined to be at a sudden braking event.

12. The method of claim 8, wherein in the determination of whether a vehicle is at a sudden braking event, the sudden braking of a vehicle is released when the accumulated brake depth change is less than a predetermined reset criterion.

13. The method of claim 12, wherein in the operation of the drive motor, the regenerative braking torque of the drive motor is gradually increased when the sudden braking event of a vehicle is released.

14. A non-transitory computer readable medium containing program instructions executed by a controller, the computer readable medium comprising:
    program instructions that control a brake pedal sensor to detect a brake depth of a brake pedal;
    program instructions that determine whether a vehicle is at a sudden braking event by calculating a depth rate of the brake pedal based on the detected brake depth, and operate a drive motor to reduce regenerative braking torque when the vehicle is determined to be at a sudden braking event; and
    program instructions that operate the drive motor to position the driver motor at a neutral state when the vehicle is determined to be at a sudden braking event.

15. The non-transitory computer readable medium of claim 14, further comprising:
 program instructions that operate the drive motor to decrease regenerative braking torque based on the calculated depth rate when the vehicle is determined not to be at a sudden braking event.

* * * * *